(12) United States Patent
Fujimori et al.

(10) Patent No.: US 6,316,576 B1
(45) Date of Patent: Nov. 13, 2001

(54) POLYCARBONATE RESIN AND PROCESS FOR PRODUCING THE SAME

(75) Inventors: Takayasu Fujimori; Kenichi Nakamura; Masukazu Hirata, all of Tsukuba (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/477,432

(22) Filed: Jan. 4, 2000

(30) Foreign Application Priority Data

Jan. 8, 1999 (JP) .................................................. 11-003382

(51) Int. Cl.$^7$ .................................................. C08G 64/00
(52) U.S. Cl. ............................................. 528/196; 528/198
(58) Field of Search ...................................... 528/196, 198

(56) References Cited

U.S. PATENT DOCUMENTS 4,910,283   3/1990   Kawaki et al. ....................... 528/201

FOREIGN PATENT DOCUMENTS 0 357 073   3/1990   (EP) .
64-66234   3/1989   (JP) ................................ C08G/63/62

OTHER PUBLICATIONS

Patent Abstracts of Japan for JP 58–173125, vol. 008, No. 003 (Oct. 12, 1983).
Derwent publication XP–002174025 for JP 1–223121 (Sep. 6, 1989).
Derwent Publication XP–002174024 for JP 58–174419 (Oct. 13, 1983).
Derwent Publication XP–002174003 for JP 2–024308 (Jan. 26, 1990).

*Primary Examiner*—Terressa M. Boykin
(74) *Attorney, Agent, or Firm*—Sughrue, Mion, Zinn, Macpeak & Seas, PLLC

(57) ABSTRACT

A polycarbonate resin obtainable by reaction of pentacyclopentadecanedimethanol with carbonic acid diester and a polycarbonate resin obtainable by reaction of pentacyclopentadecanedimethanol, an aromatic dihydroxy compound and carbonic acid diester having a low photoelastic constant and a good balance between refractive index and Abbe's number.

11 Claims, No Drawings

POLYCARBONATE RESIN AND PROCESS FOR PRODUCING THE SAME

BACKGROUND OF THE INVENTION

1) Field of the Invention

The present invention relates to a polycarbonate resin with transparency, heat resistance, a low photoelastic constant and a good property balance between refractive index and Abbe's number, which is suitably applicable to plastic optical products including optical disc substrates, various lenses, prisms and optical fibers and a process for producing the same.

2) Prior Art

Polycarbonate resin from 2,2-bis(4-hydroxyphenyl) propane (the so-called bisphenol A) obtainable by reaction of bisphenol A with phosgene or carbonic acid diester is applied in a wide range to structure materials and optical disc substrates, various lenses, prisms and optical fibers as optical materials since it has excellent heat resistance, transparency and furthermore excellent mechanical properties such as impact resistance.

However, the polycarbonate resin from bisphenol A causes a problem in which double refraction becomes large due to molecular orientation or residual stress during molding since it is a material with low flowability and has a high photoelastic constant. Thus, when an optical material composed of the polycarbonate resin from bisphenol A is molded, a method for lowering double refraction of its product by molding at a high temperature using a polycarbonate resin with comparatively low molecular weight has been applied. However, since there is a limit for lowering double refraction of the polycarbonate resin produced from bisphenol A even in the above-mentioned method, a material with further low photoelastic constant and high flowability has been earnestly required in a partial field of optical material, particularly in the field of optical disc with recent expansion of use of optical material.

As a method for lowering a photoelastic constant of a polycarbonate resin, for example, as shown in Japanese Patent Kokai (Laid-open) No.64-66234, a method for copolymerizing bisphenol A with tricyclo $(5.2.1.0^{2.6})$decane dimethanol is known. However, the method causes deterioration of heat resistance and does not provide sufficient effects in lowering of photoelastic constant.

Further, as lens materials, particularly a spectacle lens material, CR-39 (diethyleneglycol bisarylcarbonate) has been widely used, but it causes a problem of low productivity since it is a thermosetting resin with a low refractive index of 1.50. Thus, it has been desired to solve such problem.

SUMMARY OF THE INVENTION

An object of the present invention is to solve above-mentioned prior art problems and provide a polycarbonate resin having a lower photoelastic constant than a polycarbonate resin from bisphenol A and a good balance between refractive index and Abbe's number and a process for producing the same.

As a result of extensive studies to solve above-mentioned prior art problems, the inventors have found that the problems can be solved by providing a polycarbonate resin derived from pentacyclopentadecanedimethanol, and has accomplished the present invention.

That is, the present invention provides a polycarbonate resin obtainable by reaction of pentacyclopentadecanedimethanol with carbonic acid diester.

The present invention provides also a polycarbonate resin obtainable by reaction of pentacyclopentadecanedimethanol, an aromatic dihydroxy compound represented by the general formula (1) and carbonic acid diester.

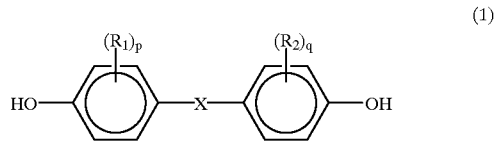

wherein each $R_1$ and $R_2$, independently, is a hydrogen atom, a halogen atom, an alkyl group having 1 to 20 carbon atoms, an alkoxyl group having 1 to 20 carbon atoms, a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms, and p and q represent the number of substituent which is an integer of 0 to 4, and X is:

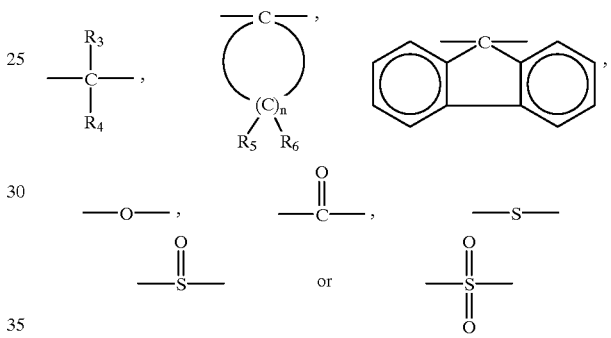

and each $R_3$ and $R_4$, independently, is a hydrogen atom, an alkyl group having 1 to 12 carbon atoms, or an aryl group having 6 to 20 carbon atoms and $R_5$ and $R_6$, independently, is a hydrogen atom, an alkyl group having 1 to 4 carbon atoms, and n is an integer of 4 to 9.

DETAILED DESCRIPTION OF THE INVENTION

The polycarbonate resin of the present invention is obtained by pentacyclopentadecanedimethanol (hereinafter, referred to as "PCPDM") and carbonic acid diester.

PCPDM is a compound(s) represented by the following formulas (2) and/or (3) and may be a single substance and a mixture of each isomer thereof in an optional ratio.

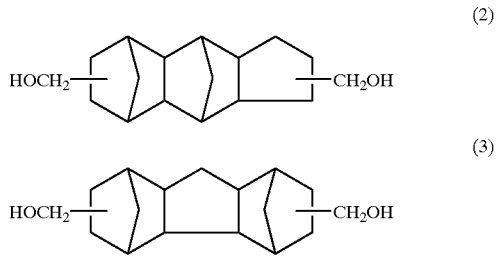

It is preferable from the viewpoint of property balance to introduce an aromatic dihydroxy compound represented by the following general formula(1) (hereinafter, referred to as "aromatic dihydroxy compound") as a reactant in addition to PCPDM and carbonic acid diester.

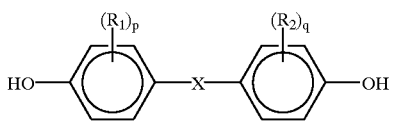

wherein each $R_1$ and $R_2$, independently, is a hydrogen atom, a halogen atom, an alkyl group having 1 to 20 carbon atoms, an alkoxyl group having 1 to 20 carbon atoms, a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms, and p and q represent the number of substituent which is an integer of 0 to 4, and X is:

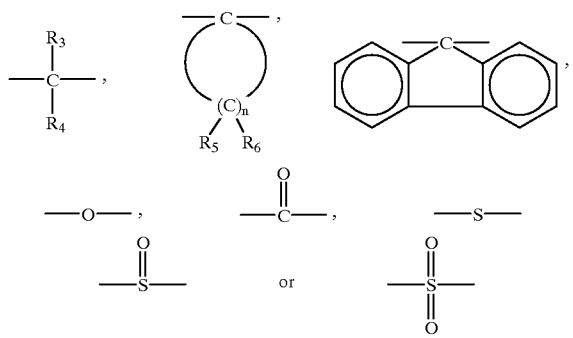

and each $R_3$ and $R_4$, independently, is a hydrogen atom, an alkyl group having 1 to 12 carbon atoms, or an aryl group having 6 to 20 carbon atoms and $R_5$ and $R_6$, independently, is a hydrogen atom, an alkyl group having 1 to 4 carbon atoms, and n is an integer of 4 to 9.

The molar ratio of the aromatic hydroxy compound/PCPDM is 0/100 to 70/30 and preferably 5/95 to 60/40. When the molar ratio of the aromatic hydroxy compound/PCPDM is above 70/30, it is not preferable since the photoelastic constant of the polycarbonate resin becomes large and furthermore the balance between refractive index and Abbe's number becomes bad.

In the polycarbonate resin of the present invention, it is possible to improve impact strength by containing the aromatic dihydroxy compound as a reactant. That is, it is preferable that the molar ratio of the aromatic hydroxy compound/PCPDM is 30/70 to 70/30 from the viewpoint of impact strength. When the molar ratio is below 30/70, effects for impact strength becomes small.

Examples of the aromatic dihydroxy compound include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane,2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane,1,1-bis(4-hydroxyphenyl)cyclopentane, 1,1-bis(4-hydroxyphenyl)cyclohexane, 2,2-bis(4-hydroxy-3-methoxyphenyl)propane, 9,9-bis(4-hydroxyphenyl)fluorene, 9,9-bis(4-hydroxy-3-methylphenyl)fluorene, 4,4'-dihydroxydiphenylether, 4,4'-dihydroxy-3,3'-dimethyldiphenylether, 4,4'-dihydroxyphenyl sulfide, 4,4'-dihydroxy-3,3'-dimethyldiphenyl sulfide, 4,4'-dihydroxydiphenyl sulfoxide, 4,4'-dihydroxy-3,3'-dimethyl diphenyl sulfoxide, 4,4'-dihydroxy diphenyl sulfone and 4,4'-dihydroxy-3,3'-dimethyl diphenyl sulfone.

As the aromatic dihydroxy compound, particularly 2,2-bis(4-hydroxyphenyl)propane(the so-called bisphenol A) is suitably used. Bisphenol A is very useful since it has been produced in a large amount in a low price as a raw material of polycarbonate resin and use of bisphenol A makes possible increase of impact resistance without impairing heat resistance.

In the present invention, other species of dihydroxy compound than the aromatic dihydroxy compound represented by the general formula (1) may be copolymerized with PCPDM, the aromatic hydroxy compound and carbonic acid diester in the range not to impair various properties. Examples of other species of dihydroxy compound include tricyclo $(5.2.1.0^{2\cdot6})$ decanedimethanol, 1,4-cyclohexanedimethanol, 2,6-decalindimethanol, norbornanedimethanol, spiroglycol, hydroquinone, resorcin and 4,4'-dihydroxybiphenyl.

The polycarbonate resin of the present invention has a low photoelastic constant, excellent refractive index and Abbe's number since it contains a structural unit derived from PCPDM, a structural unit derived from carbonic acid diester, and furthermore the aromatic dihydroxy compound in a prescribed ratio and has random, block or alternate copolymerization structure.

The polycarbonate resin has a photoelastic constant of $60 \times 10^{-12}$ $m^2/N$ or below and more preferably $50 \times 10^{-13}$ $m^2/N$ or below. When the photoelastic constant is above $60 \times 10^{-12}$ $m^2/N$, it is not preferable since double refraction becomes large, for example, its use as optical disc substrate causes a large error in reading signals.

It is preferable that the polycarbonate resin has a refractive index of 1.53 or above and an Abbe's number of 35 or above. When the refractive index is below 1.53, it is not preferable that when plastic lenses are formed of the polycarbonate resin, it is necessary to make the lenses thick. When Abbe's number is below 35, it is not preferable that when plastic spectacle lenses formed of the polycarbonate resin is used, abuse such as fatigue of eyes readily occurs.

Examples of the carbonic acid diester of the present invention, include diphenyl carbonate, ditolylcarbonate, bis(chlorophenyl)carbonate, di-m-cresyl carbonate, dinaphthyl carbonate, dimethyl carbonate, diethyl carbonate, dibutyl carbonate, dicyclohexyl carbonate, among which diphenyl carbonate is preferable.

When the polycarbonate resin is produced by reaction of PCPDM with carbonic acid diester that is used in a molar ratio of preferably 0.97 to 1.10 mol and more preferably 0.99 to 1.04 mol per 1 mol of PCPDM. When the aromatic dihydroxy compound is used, carbonic acid diester is used in a molar ratio of preferably 0.97 to 1.10 mol and more preferably 0.99 to 1.04 mol per tolal 1 mol of the aromatic dihydroxy compound and PCPDM.

The polystyrene conversion weight average molecular weight of the polycarbonate resin is preferably 20,000, to 200,000 and more preferably 40,000 to 130,000. When the polystyrene conversion weight average molecular weight is below 20,000, strength of molding article is insufficient, whereas above 200,000, it is not preferable since flowability during molding deteriorates.

In the process for producing the polycarbonate resin, basic compound is used as catalyst. Examples of the basic compound include alkali metal compounds, alkaline earth metal compounds, nitrogen-containing compounds and phosphorus-containing compounds.

As the basic compound, organic acid salts, inorganic acid salts, oxides, hydroxides, hydrides or alkoxides of alkali metal and alkaline earth metal, quaternary ammonium hydroxides and salts thereof and amines are preferably used. One kind of above-mentioned compound and a mixture of above-mentioned compounds can be used.

Examples of the alkali metal compounds include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, petassium stearate, cesium stearate, lithium stearate, sodium hydrogenborate, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, sodium tetraphenyl borate, each disodium salt, dipotassium salt, dicesium salt and dilithium salt of bisphenol A and each sodium salt, potassium salt, cesium salt and lithium salt of phenol.

Examples of the alkaline earth metal compounds include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate calcium stearate, strontium stearate, barium stearate, calcium benzoate, magnesium phenylphosphate, each magnesium salt, calcium salt, strontium salt and barium salt of phenol.

Examples of the nitrogen-containing compound and phosphorus-containing compound include quaternary ammonium hydroxides having alkyl group, aryl group or aralkyl group including tetramethylammonium hydroxide, tetraethylammonium hydroxide, tetrapropylammonium hydroxide, tetrabutylammonium hydroxide and trimethylbenzilammonium hydroxide, tertiary amines including triethyamine, dimethylbenzilamine and triphenylamine, secondary amines including diethylamine and dibutylamine, primary amines including propylamine and butylamine, imidazoles including 2-methylimidazole and 2-phenylimidazole and basic salts including ammonia, tetramethylammonium borohydride, tetrabutylammonium borohydride, tetrabutylammonium tetraphenylborate, tetraphenylammonium tetraphenylborate and tetraphenylphosphonium tetraphenylborate.

The catalyst is used in a molar ratio of $10^{-9}$ to $10^{-3}$ mol and preferably $10^{-7}$ to $10^{-4}$ mol per total 1 mol of PCPDM and the aromatic dihydroxy compound.

The transesterification in the present invention can be performed by known melt polycondensation process. That is, melt polycondensation is performed by transesterification with heating under atmospheric pressure or a reduced pressure using above-mentioned raw materials and catalyst while removing by-products.

The reaction is usually performed in multiple stages of two stages or above. The first stage reaction is performed at a temperature of 120 to 260° C. and preferably 180 to 240° C. for 0.1 to 5 hours and preferably 0.5 to 3 hours. Then, the reaction of the aromatic dihydroxy compound, PCPDM and carbonic acid diester is performed while increasing the degree of reduced pressure in the reaction system and elevating the reaction temperature and finally polycondensation is performed under a reduced pressure of 1 mmHg or below at a temperature of 200 to 300° C. Such reaction may be performed in a continuous process or in a batch wise. The reaction apparatus to be used in above-mentioned reaction may a vertical type reaction apparatus equipped with anchor type stirring blade, maxblend stirring blade helicalribbon type stirring blade, etc., a horizontal type reaction apparatus equipped with paddle blade, lattice blade, spectacle shaped blade and an extruder type reaction apparatus equipped with a screw and it is suitable to use a combination of above-mentioned reaction apparatuses.

In the process of producing the polycarbonate resin, after the completion of the polymerization reaction, the catalyst is removed or deactivated in order to maintain heat stability and hydrolysis stability of the polycarbonate resin thus obtained. Usually, a method for deactivating a transesterification catalyst of alkali metal or alkaline earth metal by addition of known acid substance is suitably applied.

Examples of the acid substance include aromatic sulfonic acids including p-toluene sulfonic acid, aromatic sulfonates including butyl p-toluenesulfonate and hexyl p-toluenesulfonate, aromatic sulfonic acid phosphonium salts including dodecylbenzene sulfonic acid tetrabutyl phosphonium salt, alkyl sulfate including dimethyl sulfate, organic halides including stearoyl chloride, benzoyl chloride and p-toluenesulfonyl chloride and benzil chloride.

After the deactivation of the catalyst, a step to remove low boiling point compounds in the polymer with vaporization under a pressure of 0.1 to 1 mmHg at a temperature of 200 to 300° C. may be added. For its purpose, a horizontal apparatus equipped with a stirring blade with excellent surface renewing capacity such as paddle blade, lattice blade, spectacle blade, etc. or thin film vaporizer is suitably used.

The polycarbonate resin can contain various additives and agents other than above-mentioned heat stabilizer and hydrolysis stabilizer. Examples of the additives and agents include an antioxidant, dye, pigment, a reinforcing agent, a filler, an ultraviolet absorber, a lubricating agent, a releasing agent, a crystal nuclear agent, a plasticizer, a flowability improving agent, an antistatic agent, an antibacterial agent, etc,.

Regarding the timing to add above-mentioned additives and agents, they may be added during which melting state of the polycarbonate resin is maintained just after the reaction or further added after pelletizing the polycarbonate resin. Where they are added to the polycarbonate resin in which melting state is maintained just after the reaction, a process comprising adding them to the resin withdrawn from the reactor, then transferring it into a horizontal kneading machine to knead uniformly and then pelletizing or a process comprising transferring the resin withdrawn from the reactor into a horizontal kneading machine and adding them via side feed to the kneading machine to knead uniformly and then pelltizing is suitably applied.

When they are added to a pelletized resin, a process comprising mixing and dispersing the pellets and above-mentioned additives and agents with a mixer including, typically, a tumbler mixer, a Henschel mixer, a ribbon blender, a super mixer and then melt kneading with a kneading machine such as an extruder, Bumbary mixer, rolls are suitably selected.

DESCRIPTION OF THE PREFERRED EMBODIMENTS

The present invention will be described in more detail below, referring to Examples, which are not intended to limit the scope of the present invention.

Example 1

52.5 g (0.2 mol) of pentacyclopentadecanedimethanol (hereinafter "PCPDM"), 43.3 g (0.202 mol) of diphenyl carbonate and $5 \times 10^{-4}$ g ($6 \times 10^{-6}$ mol) of sodium hydrogencarbonate was charged to a four-neck flask of capacity 300 ml equipped with a stirrer and a distiller and then heated at 180° C. under nitrogen atmosphere of 760 mmHg and then stirred for 30 minutes.

Then, the reduced pressure degree in the interior of the flask was adjusted to 150 mmHg and the temperature in the interior of the flask was elevated up to 200° C. at the rate of 60° C./hr and maintained to 200° C. for 40 minutes and the transesterification reaction was performed. The temperature was further elevated up to 225° C. at the rate of 75° C./hr, and after 40 minutes of the completion of elevation of the temperature, the reduced pressure degree was set to 1 mmHg or below over one hour while maintaining 225° C. Then, the temperature was elevated up to 235° C. at the rate of 105° C./hr and the reaction was performed with stirring for total 6 hours. After the completion of the reaction, nitrogen was injected into the interior of the reactor to return to atmospheric pressure and a polycarbonate resin thus produced was withdrawn. The measured results of the properties of the polycarbonate resin was shown in Table 1.

Example 2

The experiment was performed in the same manner as in Example 1 except that 26.2 g (0.1 mol) of PCPDM, 22.8 g (0.1 mol) of 2,2-bis(4-hydroxyphenyl)propane (hereinafter "BPA"), 43.5 g (0.203 mol) of diphenyl carbonate and $5 \times 10^{-4}$ ($6 \times 10^{-6}$ mol) of sodium hydrogencarbonate were used. The measured results of the properties of the polycarbonate resin was shown in Table 1.

Example 3

The experiment was performed in the same manner as in Example 1 except that 15.7 g (0.06 mol) of PCPDM, 32.0 g (0.14 mol) of BPA, 43.5 g (0.203 mol) of diphenyl carbonate and $5 \times 10^{-4}$ g ($6 \times 10^{-6}$ mol) of sodium hydrogencarbonate were used. The measured results of the properties of the polycarbonate resin was shown in Table 1.

Comparative Example 1

The experiment was performed in the same manner as in Example 1 except that 45.7 g (0.2 mol) of BPA, 44.1 g (0.206 mol) of diphenyl carbonate and $5 \times 10^{-5}$ g ($6 \times 10^{-7}$ mol) of sodium hydrogencarbonate were used and PCPDM was not used, and the reduced pressure was adjusted to 1 mmHg or below and then the temperature was elevated up to 280° C. at the rate of 105° C./hr and the reaction was performed with stirring for total 7 hours. The measured results of the properties of the polycarbonate resin was shown in Table 1.

Comparative Example 2

The measured results of the properties of polymethylmethacrylate obtained on the market was shown in Table 1.

The properties in Table 1 were measured according to the following methods.

[Refractive Index ($n_D$) and Abbe's Number ($v_D$)]

The measurement was performed by refractometer of ATAGO.

[Polystyrene Converted Weight Average Molecular Weight (Mw)]

The measurement was performed by GPC (Gel Permeation Chromatography) using monodispersed polystyrene having a known molecular weight as standard substance and chloroform as developing solvent.

[Glass Transition Temperature (Tg)]

The measurement was performed by a differential scanning calorimeter.

[Thermal Decomposition Starting Temperature (Td)]

A temperature at which sample weight was decreased by 1% in a nitrogen stream was measured by a thermobalance. The temperature elevation rate was 10° C./min.

[Photoelastic Constant]

A light of laser wave length 633 nm was applied to a cast film of each sample of thickness 100 μm by Ellipsomater, whereby double refraction for change of load was measured and photoelastic constant was calculated based on the measured results.

[Falling Ball Impact Strength]

A steel ball was free fallen on a press test piece of diameter 40 mm and thickness 3 mm from a height of 127 cm and it was represented by maximum weight of the steel ball in which the test piece was not broken.

The following abbreviations were used for the compounds in Table.

PCPDM: pentacyclopentadecanedimethanol
BPA: 2,2-bis(4-hydroxyphenyl)propane
PMMA: polymethylmethacrylate The polycarbonate resin of the present invention is a novel aliphatic polycarbonate resin and aliphatic-aromatic copolymerization polycarbonate resin with a low photoelastic constant maintaining characteristics of aliphatic polycarbonate resin such as excellent transparency and heat resistance, and a good balance between refractive index and Abbe's number and very usefully applicable to materials of plastic optical products such as optical disc substrates, various lenses, prisms and optical fibers.

TABLE 1

| Example & Com. Ex. | Example 1 | Example 2 | Example 3 | Comp. Ex. 1 | Comp. Ex. 2 |
|---|---|---|---|---|---|
| Molar ratio of PCPDM/BPA | 100/0 | 50/50 | 30/70 | 0/100 | (PMMA) |
| Refractive index ($n_D$) | 1.537 | 1.562 | 1.573 | 1.586 | 1.497 |
| Abbe's number ($v_D$) | 49 | 39 | 35 | 30 | 58 |
| Mw | 67100 | 66300 | 64000 | 34500 | 74500 |
| Tg (° C.) | 136 | 133 | 139 | 148 | 100 |
| Td (° C.) | 334 | 325 | 330 | 445 | 310 |
| Photoelastic constant ($10^{-12}$ m$^2$/N) | 12 | 35 | 53 | 78 | 6 |
| Falling ball impact strength (g) | 44 | 67 | 112 | 353 | 16 |

What is claimed is:

1. A polycarbonate resin obtained by reacting pentacyclopentadecanedimethanol with a carbonic acid diester.

2. The polycarbonate resin according to claim 1, wherein a ratio of 0.97 to 1.10 mol of a carbonic acid diester per 1 mol of pentacyclopentadecanedimethanol is used.

3. The polycarbonate resin according to claim 1, having a photoelastic constant of $60 \times 10^{-12}$ m$^2$/N or less.

4. A polycarbonate resin obtained by reacting pentacyclopentadecanedimethanol, an aromatic dihydroxy compound represented by the general formula (1) and a carbonic acid diester

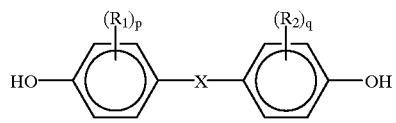
(1)

wherein each $R_1$ and $R_2$, independently, is a hydrogen atom, a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms, p and q each independently represents an integer of 0 to 4, and X is:

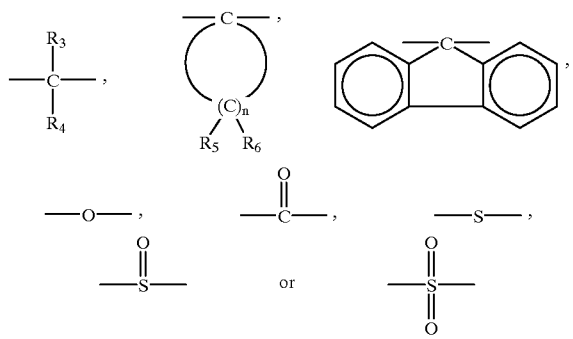

wherein each $R_3$ and $R_4$, independently, is a hydrogen atom, an alkyl group having 1 to 12 carbon atoms, or an aryl group having 6 to 20 carbon atoms, each $R_5$ and $R_6$, independently, is a hydrogen atom or an alkyl group having 1 to 4 carbon atoms, and n is an integer of 4 to 9.

5. The polycarbonate resin according to claim 4, wherein a ratio of 0.97 to 1.10 mol of a carbonic acid diester per total 1 mol of pentacyclopentadecanedimethanol and the aromatic dihydroxy compound represented by the general formula (1) is used.

6. The polycarbonate resin according to claim 4, wherein a molar ratio of the aromatic dihydroxy compound represented by the general formula (1) to pentacyclopentadecanedimethanol is 5/95 to 70/30.

7. The polycarbonate resin according to claim 4, having a photoelastic constant of $60 \times 10^{-12}$ m/N or less.

8. The polycarbonate resin according to claim 4, wherein each $R_3$ and $R_4$ in the general formula (1) is a methyl group.

9. A process for producing a polycarbonate resin which comprises performing polycondensation of pentacyclopentadecanedimethanol, an aromatic dihydroxy compound represented by the general formula (1) and carbonic acid diester in the presence of a basic compound catalyst

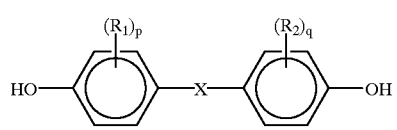
(1)

wherein each $R_1$ and $R_2$, independently, is a hydrogen atom, a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxyl group having 6 to 20 carbon atoms or an aryloxy group having 6 to 20 carbon atoms, p and q each independently represents an integer of 0 to 4, and X is:

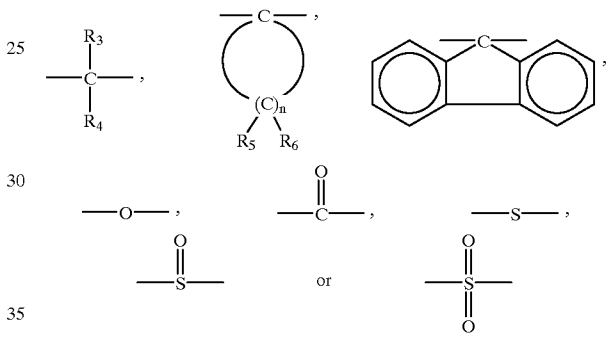

wherein each $R_3$ and $R_4$, independently, is a hydrogen atom, an alkyl group having 1 to 12 carbon atoms, or an aryl group having 6 to 20 carbon atoms, each $R_5$ and $R_6$, independently, is a hydrogen atom or an alkyl group having 1 to 4 carbon atoms, and n is an integer of 4 to 9.

10. The process according to claim 9, wherein $10^{-9}$ to $10^{-3}$ mol of the basic compound catalyst to a total 1 mol of pentacyclopentadecanedimethanol and the aromatic dihydroxy compound represented by the general formula (1) is used.

11. The process according to claim 9, wherein each $R_3$ and $R_4$ in the general formula (1) is a methyl group.

* * * * *